United States Patent
Hsu et al.

(10) Patent No.: US 10,162,929 B2
(45) Date of Patent: Dec. 25, 2018

(54) SYSTEMS AND METHODS FOR USING MULTIPLE LIBRARIES WITH DIFFERENT CELL PRE-COLORING

(71) Applicant: Taiwan Semiconductor Manufacturing Co., Ltd., Hsinchu (TW)

(72) Inventors: Meng-Kai Hsu, Hsinchu (TW); Yuan-Te Hou, Hsinchu (TW); Wen-Hao Chen, Hsinchu (TW)

(73) Assignee: Taiwan Semiconductor Manufacturing Co., Ltd., Taiwan (CN)

( * ) Notice: Subject to any disclaimer, the term of this patent is extended or adjusted under 35 U.S.C. 154(b) by 98 days.

(21) Appl. No.: 15/145,389

(22) Filed: May 3, 2016

(65) Prior Publication Data
US 2017/0323046 A1  Nov. 9, 2017

(51) Int. Cl.
*G06F 17/50* (2006.01)

(52) U.S. Cl.
CPC ...... *G06F 17/5081* (2013.01); *G06F 17/5072* (2013.01); *G06F 2217/12* (2013.01); *G06F 2217/84* (2013.01)

(58) Field of Classification Search
USPC .......................................................... 716/51
See application file for complete search history.

(56) References Cited

U.S. PATENT DOCUMENTS

| | | | |
|---|---|---|---|
| 8,601,416 B2 | 12/2013 | Kuo et al. | |
| 8,762,900 B2 | 6/2014 | Shin et al. | |
| 8,775,993 B2 | 7/2014 | Huang et al. | |
| 8,887,116 B2 | 11/2014 | Ho et al. | |
| 8,943,445 B2 | 1/2015 | Chen et al. | |
| 8,990,762 B2 | 3/2015 | Yuh et al. | |
| 9,081,933 B2 | 7/2015 | Liu et al. | |
| 9,183,341 B2 | 11/2015 | Chen et al. | |
| 9,213,790 B2 | 12/2015 | Hsu et al. | |
| 2013/0061186 A1* | 3/2013 | Hsu | G06F 17/50 716/55 |
| 2014/0237435 A1 | 8/2014 | Chen et al. | |
| 2014/0282293 A1* | 9/2014 | Lin | G06F 17/5081 716/52 |
| 2014/0304670 A1 | 10/2014 | Su et al. | |
| 2015/0121317 A1* | 4/2015 | Lee | G03F 1/00 716/52 |
| 2015/0278419 A1 | 10/2015 | Yang et al. | |
| 2015/0370937 A1 | 12/2015 | Liu et al. | |
| 2015/0370945 A1 | 12/2015 | Lee | |
| 2016/0147933 A1* | 5/2016 | Petermann | G06F 17/5081 716/52 |

* cited by examiner

*Primary Examiner* — Mohammed Alam
(74) *Attorney, Agent, or Firm* — Sterne, Kessler, Goldstein & Fox, P.L.L.C.

(57) ABSTRACT

The present disclosure is directed to systems and methods for using multiple libraries with different cell pre-coloring. In embodiments, the present disclosure determines a first set of cells to be placed using a single library methodology for pre-coloring and a second set of cells to be placed using a multiple library methodology for pre-coloring. In further embodiments, color-aware cell swapping can be performed based on the first set of cells and the second set of cells to align cells to swap the pre-coloring arrangements of cells to align with a track color of a closest legalization site candidate.

20 Claims, 5 Drawing Sheets

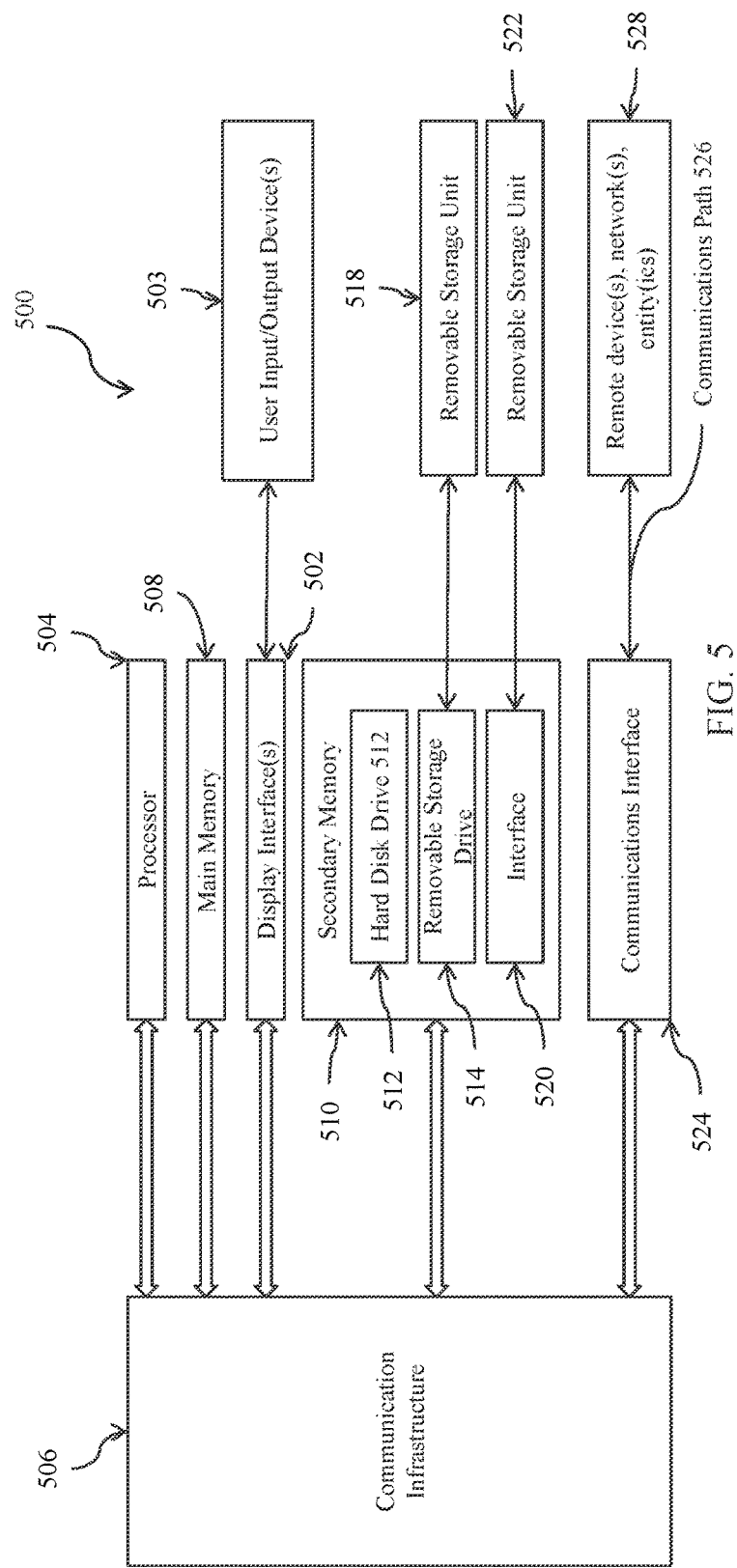

SYSTEMS AND METHODS FOR USING MULTIPLE LIBRARIES WITH DIFFERENT CELL PRE-COLORING

BACKGROUND

In advanced semiconductor manufacturing technology nodes, multiple-patterning lithography has been widely used to push the lithography limitation. Multiple patterning (or multi-patterning) is a class of technologies for manufacturing integrated circuits (ICs), developed for photolithography to enhance the feature density. Design patterns in a layout are decomposed into multiple groups, where in each group, the spacing between all patterns should be larger than a given minimum spacing. The layout decomposition problem is usually formulated as a coloring problem, and design patterns assigned with different colors are separated formed on different manufacturing masks. Design methodologies for multiple patterning can be categorized into (1) colorless techniques and (2) pre-coloring techniques.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is high-level block diagram of an example computer system, in accordance with some embodiments.

DETAILED DESCRIPTION

Figure 1:
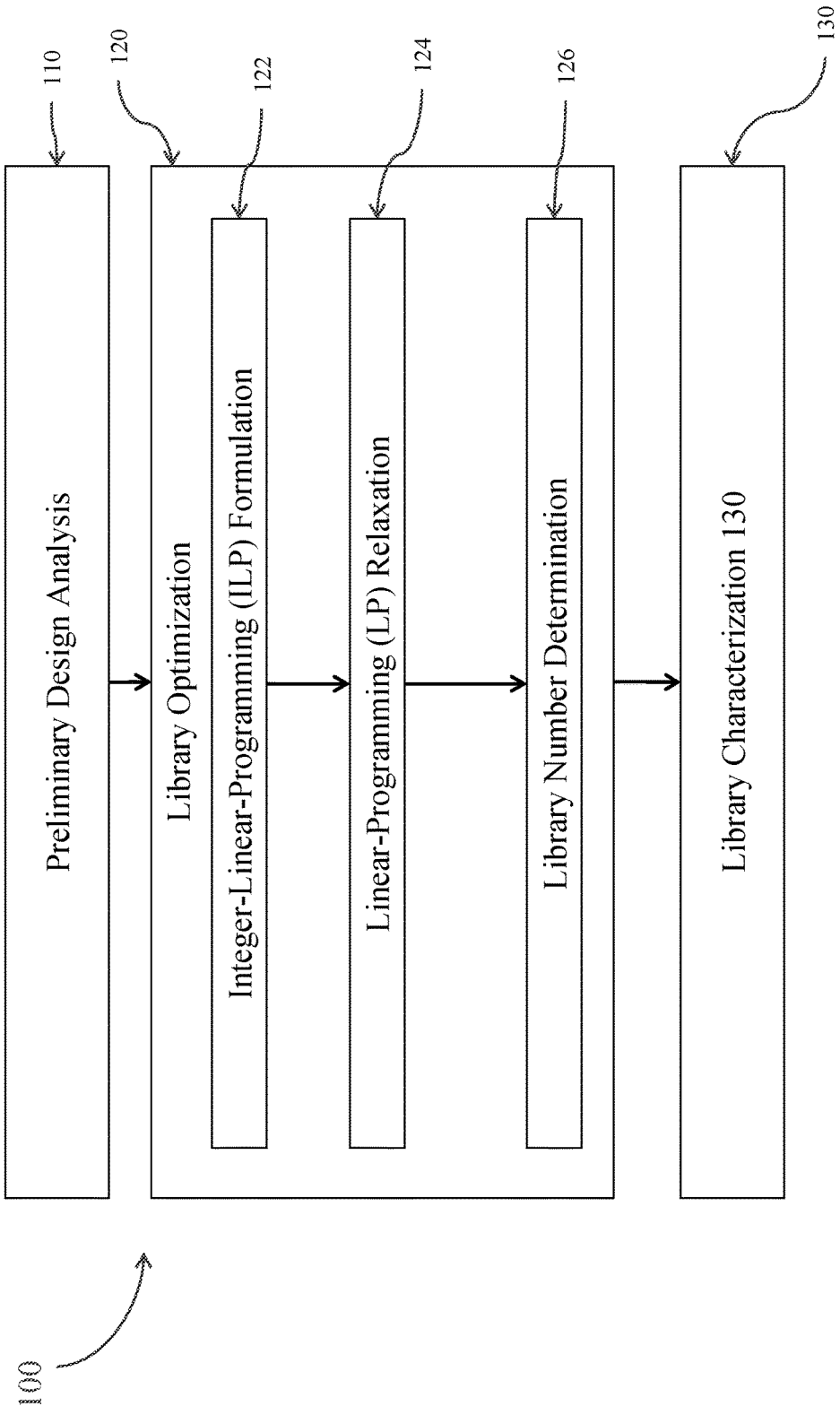
FIG. 1 illustrates an example process for a library preparation process flow, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Terminology

Library Characterization—a process of analyzing a circuit using static and dynamic methods to generate models suitable for chip implementation flows.

Design Optimization—a process of minimizing a set of pre-defined costs such as routing wire-length, timing variation, etc. of a circuit design.

Quality of Return—a set of cost functions to describe the quality of a circuit design, such as routing wire-length, timing, etc.

Legalization Displacement—a cost to describe the movement distance before and after placing a cell to a legal placement location.

Library Preparation—a process for generating timing and physical libraries for chip implementation.

Pre-coloring—assigning patterns a predefined masks before layout decomposition.

Integer Linear Programming (ILP)—a mathematical optimization or feasibility program in which some or all of the variables are restricted to be integers.

Process Design Kit (PDK)—a set of files used to model components.

Using colorless techniques, colors are assigned to the patterns after design optimization and as such, these colorless techniques generally provide for greater flexibility because colors are not fixed during optimization. However, colorless techniques also require effective multiple-patterning-aware optimization techniques to ensure decomposable layouts and it is difficult to maintain the decomposability after small changes (e.g., engineering-change-order). Alternatively, using pre-coloring techniques, colors are assigned before design optimization. Pre-coloring techniques are usually used for standard cell layouts and can guarantee a decomposable (already decomposed) solution. The pre-color techniques, however, require additional constraints to push away patterns having the same colors during optimization.

With pre-coloring techniques, cell pins and metal tracks are pre-colored, and during cell placement, cells are placed such that the colors of cell pins are aligned with track colors. To achieve this, some pre-coloring implementations use a single library which uses only one pre-coloring assignment for cell pins. As a result, single library implementations may suffer from large displacement due to color misalignments. Alternatively, other pre-coloring implementations use multiple libraries with different cell pre-coloring. These multi-library implementations use more than one pre-coloring assignment for cell pins and resolve the large displacement issues of single library implementations. However, multi-library implementations may suffer from timing difference for a single cell due to process variations between different manufacturing masks.

This disclosure describes a design optimization methodology using multiple libraries which concurrently minimizes legalization displacement and timing variation impacts. As a result, in embodiments, the present disclosure can reduce library characterization time for full-set multiple-libraries and design cycle time to provide for improved quality of return ("QoR") in terms of legalization displacement and timing variation.

FIG. 1 illustrates an example process for a library preparation process flow, and that illustrative process is described below. A process for library preparation 100 can be divided in three operations: (1) preliminary design analysis 110; (2) library optimization 120; and (3) library characterization 130. Design analysis 110 includes extracting design characteristics such cell usage and a timing difference of each cell due to different pre-coloring arrangements within cells.

According to aspects of the present disclosure, the library optimization 120 minimizes a displacement between cells such that for each timing critical path, the total timing variation cost is smaller than a timing variation constraint. In embodiments, library optimization 120 includes three sub-operations: (1) integer-linear programming (ILP) formulation 122; (2) linear-programming (LP) relaxation 124; and (3) library number determination 126. ILP formulation 122 includes determining a summation of a total displacement cost and a timing variation cost. In embodiments, such determination can be based on the following values:

$x_i$=0 for a single library (or $x_i$=1 for multiple libraries) for a given cell i, $w_i$: weight of the cell i (e.g., cell usage), $a_i$: area for the cell i, $\Delta t_i$: timing difference between different libraries of the cell i, $T_j$: timing variation constraint for each critical path j, and $c_{ij}$: number of cell i in path j.

The displacement cost can be based on formula (1), and the summation of a total displacement cost and a timing variation cost can be based on formula (2):

$$d_i = \frac{w_i}{a_i}(1 - x_i) \qquad (1)$$

$$\min \sum_i d_i + \sum_j T_j \qquad (2)$$

$$\sum_{s.t.\, cell_i \in path_j} (c_{ij} \times \Delta t_i \times x_i) < T_j, \forall\, path_j$$

$$x_i \in \{0, 1\}$$

In embodiments, when $x_i$ is 0, a single library is used and the total displacement cost is greater for smaller cell areas. In contrast, when $x_i$ is 1, multiple libraries are used and there will be no displacement cost. ILP formulation 122 provides a non-deterministic polynomial-time hard problem. In embodiments, ILP relaxation 124 is performed to relax the ILP into an LP optimization problem which can be solved in polynomial time. For example, $x_i$ can be relaxed from discrete integer (0 or 1) to continuous rational numbers between 0 and 1 based on formula (3):

$$\min \sum_i d_i + \sum_j T_j \qquad (3)$$

$$\sum_{s.t.\, cell_i \in path_j} (c_{ij} \times \Delta t_i \times x_i) < T_j, \forall\, path_j$$

$$0 \le x_i \le 1$$

In embodiments, for each cell, $x_i$ can be rounded to a nearest whole integer. For example, if $x_i$ is equal to 0.9, $x_i$ can be set to 1. Based on the result of ILP relaxation 124, library number determination 126 can be used to determine the final solution of library optimization 120. For example, library number determination 126 includes determining how many cells will utilize a single library for pin coloring, e.g., $x_i$=0, and how many cells will utilize multiple libraries for pin coloring, e.g., $x_1$=1.

Figure 2:
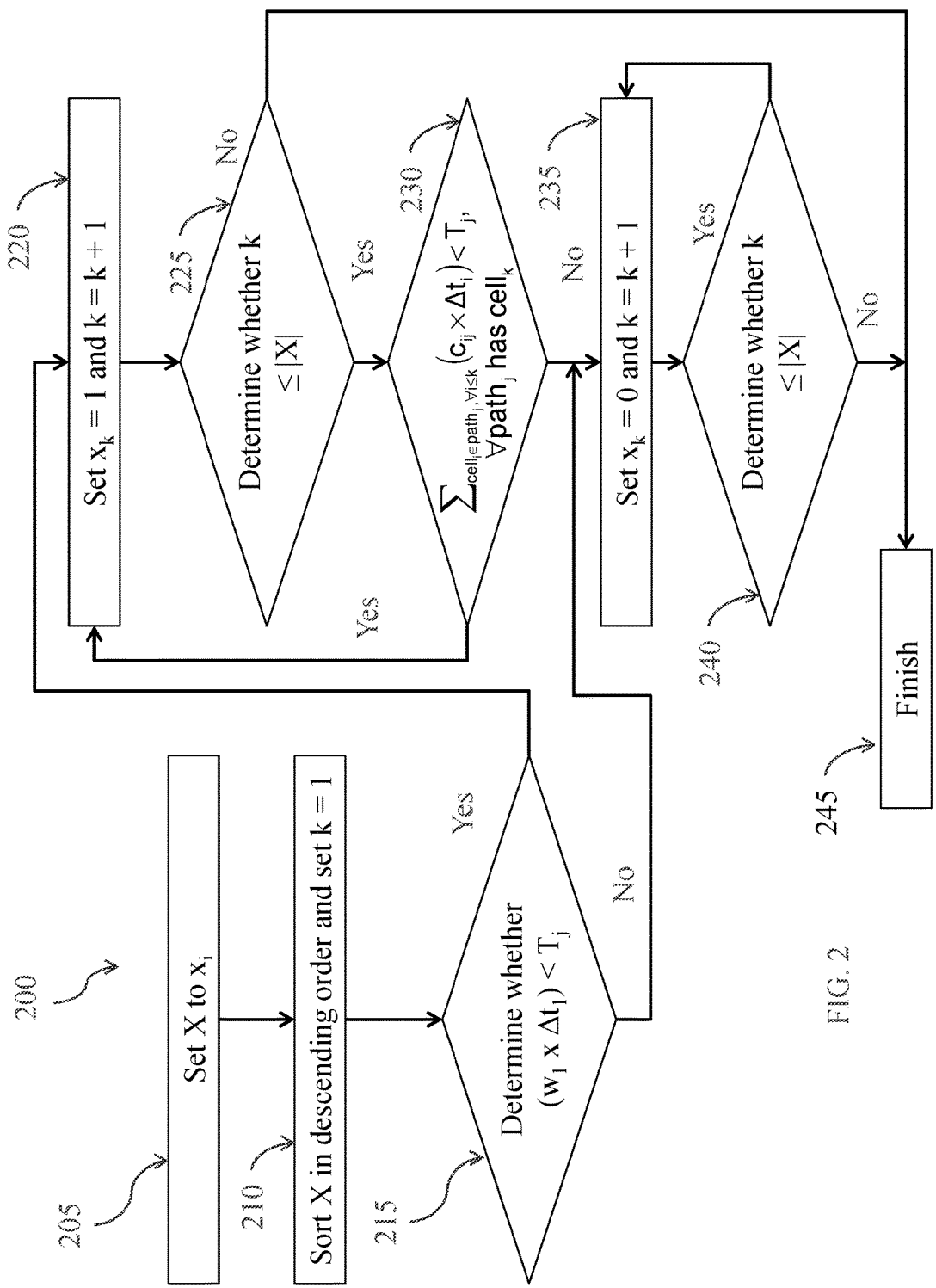
FIG. 2 illustrates an example process for a library number determination process flow, in accordance with some embodiments.

FIG. 2 is a flow chart of an exemplary process for a library number determination process flow, which is explained in detail below. A library number determination process 200, e.g., library number determination 126, includes setting X to $x_i$, i.e., the optimized solution from the LP optimization problem where |X| is the number of cell types at operation 205. In this way, X includes each of the optimized solutions as described herein. Library number determination 200 also includes sorting X in descending order and setting a cell type k to 1 at operation 210. In some embodiments, $x_i$ can be a number between 0 and 1 based on formula (3) as discussed with respect to ILP relaxation 124. In other embodiments, if $x_i$ is set to either a 1 or 0, $x_i$ can still be sorted in descending order, e.g., 1, 1, 1, 1, 1, . . . 0, 0, 0, 0, since this solution satisfies formula (3).

Illustrative library number determination 200 further includes determining whether the value of cell weight of a current cell $w_1$ multiplied by the timing variation for the current cell $\Delta t_1$ is less than the timing variation constraint $T_j$ for all of the paths j at operation 215. If the determination at operation 215 is positive, the library number determination 200 continues at operation 220 where $x_k$ is set to 1, e.g., the current cell is set to utilize multiple libraries for pin coloring, and k is set to k+1, e.g., the process proceeds to a next cell. Alternatively, when the determination at operation 215 or operation 230 is negative, i.e., no other cells can be assigned to utilize multiple libraries for pin coloring, library number determination 200 continues at operation 235

At operation 225, library number determination 200 includes determining whether the current cell type k is less than or equal to the total number of cell types |X|. If the current cell type k is greater than the total number of cell types |X|, no additional cells can be assigned to utilize multiple libraries for pin coloring and the process terminates at operation 245. If current cell type k is less than or equal to the total number of cell types |X|, library number determination 200 includes determining whether at least one path j contains the current cell, e.g., $cell_k$, in accordance with equation (4) where $c_{ij}$ is the number of cell i in path j.

$$\Sigma_{cell_i \in path_j, \forall i \le k}(c_{ij} \times \Delta t_i) > T_j \qquad (4)$$

If at least one path j includes the $cell_k$, operations 220 through 230 are repeated iteratively. In this way, library number determination 200 determines all of the cells that can utilize multiple libraries for pin coloring. If the path j does not include the $cell_k$, the process continues at operation 235 where $x_k$ is set to 0, e.g., the current cell is set to utilize a single library for pin coloring, and k is set to k+1, e.g., the process analyzes a next cell. Library number determination 200 further includes determining whether the current cell type k is less than or equal to the total number of cell types |X|. If yes, the operations 235 and 240 are repeated iteratively until operation 240 indicates that k is not less than or equal to |X|, where the process ends at operation 245. In this way, library number determination 200 determines all of the cells that can utilize a single library for pin coloring.

Figure 3:
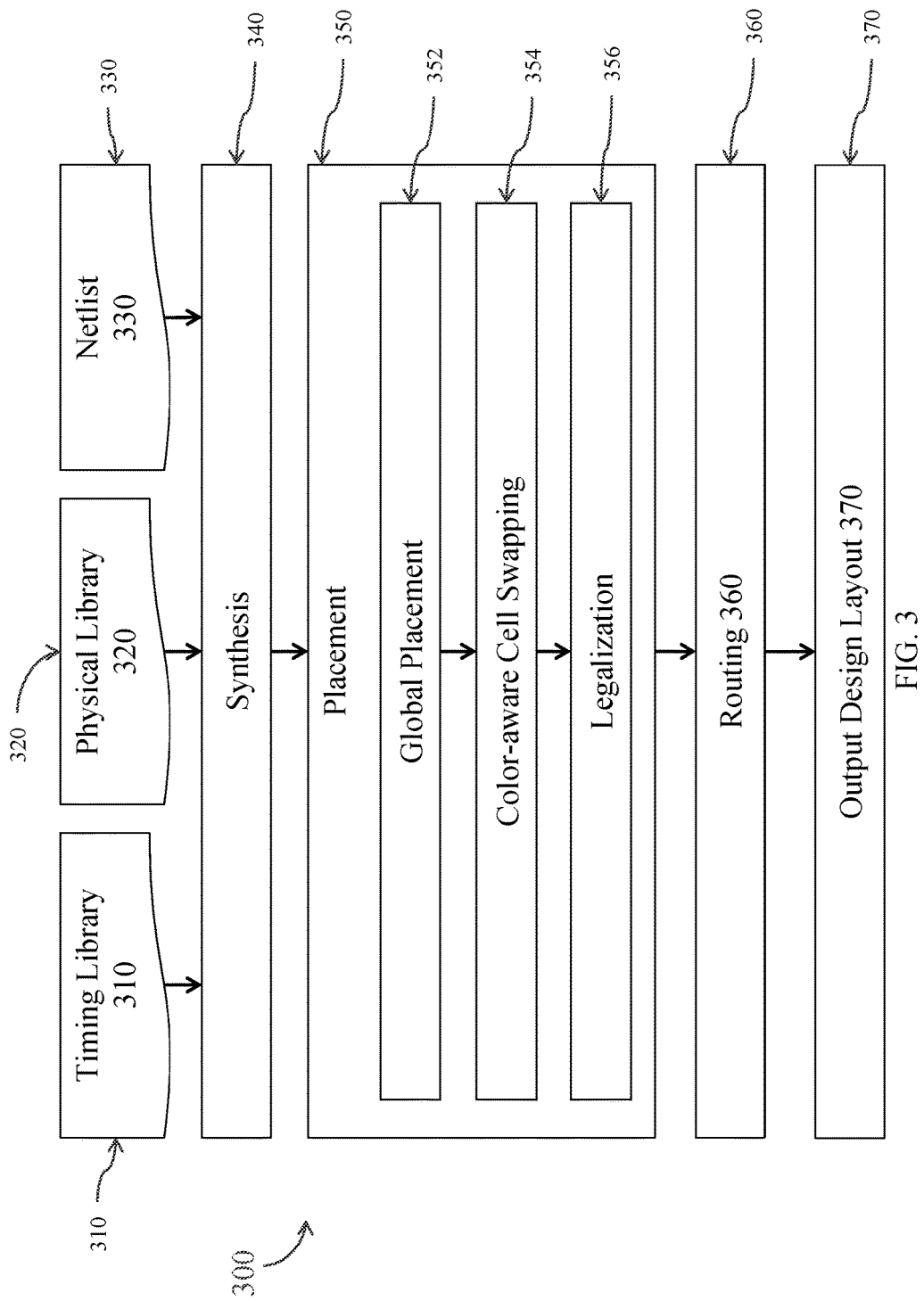
FIG. 3 illustrates an example process for a placement and routing process flow, in accordance with some embodiments.

FIG. 3 illustrates an example process for a placement and routing process flow. In embodiments, a process for placement and routing process 300 includes generating a timing library 310, generating a physical library 320, and generating a netlist 330. In embodiments, generating the timing library 310 can be based on the library characterization 130, as discussed with respect to FIG. 1. In embodiments, the timing library contains timing information, logical information, and power parameters of a collection of cells used in semiconductor fabrication processes as would be understood by those of ordinary skill in the arts. The timing library can also be used to determine delays of I/O ports and interconnects of the cells.

In embodiments, generating the physical library 320 can be based on library optimization 130. According to aspects of the present disclosure, the physical library can include one or more library of cells, each respective library of cells having a same cell layout that complies with design rule checking (DRC) requirements. The cell layout can include a cell size, e.g., width and height, and a pin layout, e.g., horizontal and vertical grid layout.

Generating the netlist 330 can include generating a netlist of the devices using a process design kit (PDK). The netlists can be generated from a schematic that is entered into a schematic capture system. The netlist can also be generated from a hardware description language (HDL) model, e.g., Verilog and VHDL, of the desired circuit. In embodiments, the PDK file can include a plurality of device models that are assigned to a respective plurality of devices. For example, the devices can include an n-type metal-oxide-semiconductor field effect transistor (MOSFET), a p-type MOSFET, a double-diffused MOS (DMOS) transistor, a p/n junction diode, a resistor, a capacitor, an inductor, a bipolar transistor, a high-voltage (HV) device, a device formed by a HV Bipolar-CMOS-DMOS (HV BCD) process, and/or other semiconductor devices.

In embodiments, the netlists can be generated on a platform, such as VIRTUOSO® commercially available from CADENCE DESIGN SYSTEMS, Inc. (San Jose, Calif.). For example, the PDK file can be used to generate a netlist for the pre-layout simulation. In some embodiments the pre-layout simulation is a static timing analysis. In embodiments, the netlist can be referred to as, for example, a transistor netlist or a gate-level netlist. In some embodiments, generating the netlists includes performing schematic entry. In alternative embodiments, generating the netlists includes synthesizing a logic circuit design.

Method 300 also includes designing an integrated circuit by performing a pre-layout synthesis 340 using the timing library, physical library, and the netlist. In some embodiments, the synthesis 340 can be performed on a circuit simulator, e.g., HSPICE® from SYNOPSYS, Inc. (San Jose, Calif.), SPECTRE® from CADENCE DESIGN SYSTEMS, Inc. (San Jose, Calif.), or any commercially available circuit simulator. Circuit simulations are typically performed during the course of designing cells for a library of cells. Once characterized cells are available, a timing analysis can be performed in addition to, or in place of a circuit simulation. In embodiments, the pre-layout simulation can be based on estimates of the circuit's parasitic loading. The pre-layout simulation can be performed using the netlist file that is generated at operation 330.

After performing synthesis 340, process 300 further includes a placement 350, which includes placing the plurality of cells in a chip design based on synthesis 340 and library optimization 120. Placement 350 further includes three sub-operations: (1) global placement 352; (2) color-aware cell swapping 354; and (3) legalization 356. Global placement 352 includes placing the cells distributed over a chip region with overlaps. During global placement 352, a placement tool can be used to generate an automatic placement of the cells with approximately regular cell densities while minimizing wire-length. In various embodiments, global placement 352 can utilize partitioning-based techniques, simulated annealing-based techniques, or analytical placement techniques, or any combination thereof, as would be understood by those of ordinary skill in the art.

Figure 4A:
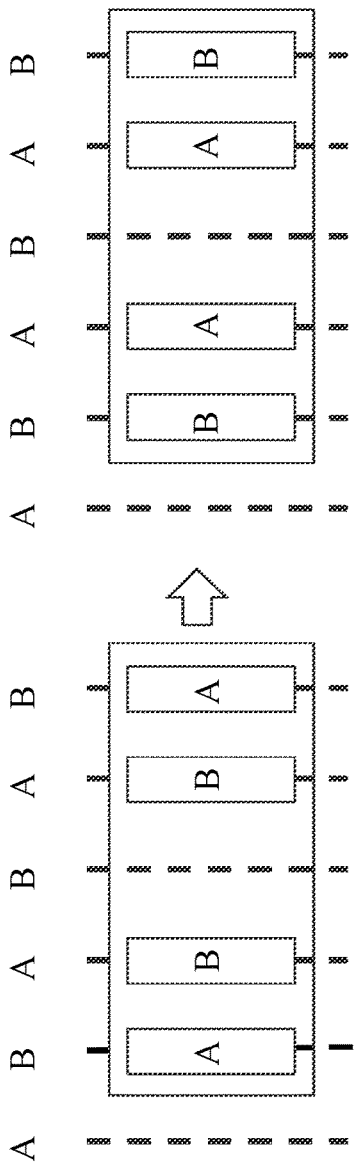
FIGS. 4A and 4B illustrate an implementations of a color-aware cell swapping processes, in accordance with some embodiments.

After determining a number cells using multiple libraries, color-aware swapping 354 includes swapping the pre-coloring arrangements of cells using multiple libraries to align with the track color of a closest legalization site candidate. For example, referring to FIG. 4A, in a double patterning implementation, a first plurality of cells has a first pre-coloring arrangement A, and a second plurality of cells has a second pre-coloring arrangement B. However, these cells are misaligned, i.e., the color of the respective cells does not match the track color. For example, the first plurality of cells having pre-coloring A are aligned with track color B and the second plurality of cells having pre-coloring B are aligned with track color A. In such a case, color-aware swapping 354 can be used to swap a respective one of the first plurality of cells with a respective one of the second plurality of cells such that the first plurality of cells and the second plurality of cells are aligned with a correct track color, i.e., cells having pre-coloring A are matched with track color A and cells having pre-coloring B are matched with track color B.

Figure 4B:
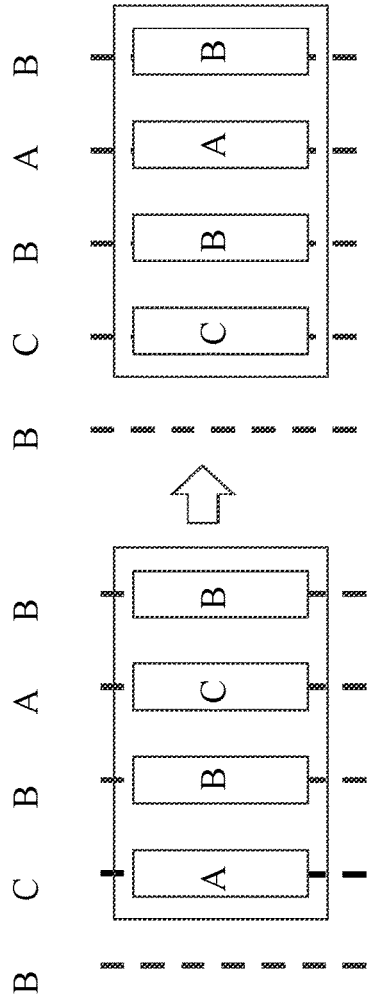

Referring to FIG. 4B, color-aware swapping 354 can also be used in a triple patterning implementation. For example, a first plurality of cells has a first pre-coloring arrangement A, a second plurality of cells has a second pre-coloring arrangement B, and a third plurality of cells has a third pre-coloring arrangement C. However, at least some of these cells are misaligned. For example, the first plurality of cells having pre-coloring A are aligned with track color C and the third plurality of cells having pre-coloring C are aligned with track color A. In embodiments, color-aware swapping 354 can be used to swap a respective one of the first plurality of cells with a respective one of the third plurality of cells such that the first plurality of cells and the third plurality of cells are aligned with a correct track color, i.e., cells having pre-coloring A are matched with track color A and cells having pre-coloring C are matched with track color C. Although FIG. 4B only shows the first plurality of cells having pre-coloring A and the third plurality of cells having pre-coloring C as being misaligned, it is further contemplated by the present disclosure that other misalignments may also occur, e.g., the second plurality of cells having pre-color B may be misaligned in addition to, or alternative to, one of the first plurality of cells and/or the third plurality of cells. It is further contemplated by the present disclosure that although color-aware swapping 354 is described with respect to double patterning and triple patterning implementations, the color-aware swapping 354 can be used with any number of multiple patterning implementations.

In embodiments, after color-aware cell swapping 354, cells may still overlap and may be misaligned with the row. To remedy the overlap and the misalignment, legalization 356 includes removing any remaining overlaps between the cells and aligning all the cells, e.g., legalization 356 legalizes the global placement 352. That is, legalizations 356 is used to place cells at legal placement sites and remove overlaps. In this way, legalization 356 removes any white spaces in the layout and reduces the overall wire-length.

Routing 360 includes routing a metal layer, e.g., a metal wiring, between the cells. In embodiments, routing 360 can include routing a metal wiring on a single layer. Alternatively, or additionally, routing 360 can include routing a metal wiring between multiple layers. In embodiments, the inter-layer wiring can be performed using interconnects such as vias or any other known interconnect.

Lastly, method 300 further includes outputting the layout to a machine readable storage medium, wherein the outputted layout is used to manufacture a set of masks used in the photolithography operations of integrated circuit fabrication at operation 370. In embodiments, outputting the layout can be performed when the LVS check is clean.

Various aspects of the exemplary embodiments may be implemented in software, firmware, hardware, or a combination thereof. FIG. 5 is an illustration of an example computer system 500 in which embodiments of the present disclosure, or portions thereof, can be implemented as computer-readable code. For example, the methods illustrated by FIGS. 1-3 can be implemented in system 500.

Various embodiments of the present disclosure are described in terms of this example computer system 500. After reading this description, it will become apparent to a person skilled in the relevant art how to implement embodiments of the present disclosure using other computer systems and/or computer architectures.

Computer system 500 includes one or more processors, such as processor 504. Processor 504 is connected to a communication infrastructure 506 (e.g., a bus or network).

Computer system 500 also includes a main memory 508, such as random access memory (RAM), and may also include a secondary memory 510. Secondary memory 510 can include, for example, a hard disk drive 512, a removable storage drive 514, and/or a memory stick. Removable storage drive 514 can include a floppy disk drive, a magnetic tape drive, an optical disk drive, a flash memory, or the like. Removable storage drive 514 reads from and/or writes to a removable storage unit 518 in a well-known manner. Removable storage unit 518 can include a floppy disk, magnetic tape, optical disk, flash drive, etc., which is read by and written to by removable storage drive 514. As will be appreciated by persons skilled in the relevant art, removable storage unit 518 includes a computer-readable storage medium having stored therein computer software and/or data. Computer system 500 includes a display interface 502 (which can include input and output devices 503 such as keyboards, mice, etc.) that forwards graphics, text, and other data from communication infrastructure 506 (or from a frame buffer not shown).

In alternative implementations, secondary memory 510 can include other similar devices for allowing computer programs or other instructions to be loaded into computer system 500. Such devices can include, for example, a removable storage unit 522 and an interface 520. Examples of such devices include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and can be implemented using wire or cable, fiber optics, a phone line, a cellular phone link, a RF link or other communications channels.

In this document, the terms "computer program storage medium" and "computer-readable storage medium" are used to generally refer to non-transitory media such as removable storage unit 518, removable storage unit 522, and a hard disk installed in hard disk drive 512. Computer program storage medium and computer-readable storage medium can also refer to memories, such as main memory 508 and secondary memory 510, which can be semiconductor memories (e.g., DRAMs, etc.). Embodiments of the present disclosure can employ any computer-readable medium, known now or in the future. Examples of computer-readable storage media include, but are not limited to, non-transitory primary storage devices (e.g., any type of random access memory), and non-transitory secondary storage devices (e.g., hard drives, floppy disks, CD ROMS, ZIP disks, tapes, magnetic storage devices, optical storage devices, MEMS, nanotechnological storage devices, etc.).

These computer program products provide software to computer system 500. Embodiments of the present disclosure are also directed to computer program products including software stored on any computer-readable storage medium. Such software, when executed in one or more data processing devices, causes a data processing device(s) to operate as described herein.

Computer programs (also called computer control logic) are stored in main memory 508 and/or secondary memory 510. Computer programs may also be received via communications interface 524. Such computer programs, when executed, enable computer system 500 to implement various embodiments of the present disclosure. In particular, the computer programs, when executed, enable processor 504 to implement processes of embodiments of the present disclosure, such as the operations in the methods illustrated by FIGS. 1-3 in system 500. Where embodiments of the present disclosure are implemented using software, the software can be stored in a computer program product and loaded into computer system 500 using removable storage drive 514, interface 520, hard drive 512, or communications interface 524.

Using the operations described herein, the approach of the present disclosure can only use 15% cells with multiple libraries and provide 86% timing variation cost improvements compared with using full-set multiple-libraries, e.g., using multiple libraries for all cells. Aspects of the present disclosure can achieve results similar to using full-set multiple-libraries which have better displacement even with smaller chip areas. Furthermore, the present disclosure provides for improved speed compared with using full-set multiple-libraries due to smaller timing variation costs, and in particular, improved speed with respect to smaller chip areas. Therefore, the present disclosure can be used to achieve better design QoR in terms of legalization displacement and timing variation in addition to reducing library characterization time for full-set multiple libraries and design cycle time.

In one embodiment, a method for using multiple libraries in cell placement includes performing a design analysis based on design characteristics of a plurality of cells. The method also includes performing a library optimization to determine a first portion of the plurality of cells to be placed using a single library for pre-coloring and a second portion of the plurality of cells to be placed using a plurality of libraries for pre-coloring. Furthermore, the method includes placing the plurality of cells in a chip design based on the design analysis and the library optimization and performing a color-aware cell swapping for the second portion of the plurality of cells. Lastly, the method includes outputting the design layout to a machine readable storage medium, wherein the outputted layout is used to manufacture a set of masks used in integrated circuit fabrication processes.

In a second embodiment, an article of manufacture includes a non-transitory computer readable medium having computer program logic stored thereon that, when executed by a computing device, causes the computing device to perform operations for using multiple libraries in cell placement. The operations include performing a design analysis based on design characteristics of a plurality of cells. The operations also include performing a library optimization to determine a first portion of the plurality of cells to be placed using a single library for pre-coloring and a second portion of the plurality of cells to be placed using a plurality of libraries for pre-coloring. Additionally, the operations includes placing the plurality of cells in a chip design based on the design analysis and the library optimization and performing a color-aware cell swapping for the second portion of the plurality of cells. Lastly, the operations include outputting the design layout to a machine readable storage medium, wherein the outputted layout is used to manufacture a set of masks used in integrated circuit fabrication processes.

In a third embodiment, a system for generating a detailed placement. The system includes a memory that stores instructions for generating a cell library. The system also includes a processor configured to perform a design analysis based on design characteristics of a plurality of cells. The processor is further configured to perform a library optimization to determine a first portion of the plurality of cells to be placed using a single library for pre-coloring and a second portion of the plurality of cells to be placed using a plurality of libraries for pre-coloring. Additionally, the processor is further configured to place the plurality of cells in a chip design based on the design analysis and the library optimization and to perform a color-aware cell swapping for the second portion of the plurality of cells. Lastly, the processor is further configured output the design layout to a machine readable storage medium, wherein the outputted layout is used to manufacture a set of masks used in integrated circuit fabrication processes.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method for using multiple libraries in cell placement, the method comprising:
    preparing the multiple libraries, comprising:
        performing a design analysis based at least on one or more circuit simulations of a plurality of cells; and
        performing a library optimization comprising:
            determining, a first portion of the plurality of cells to be placed using a single library for pre-coloring, and
            determining a second portion of the plurality of cells to be placed using a plurality of libraries for pre-coloring;
    placing the plurality of cells in a chip design based on the multiple libraries;
    swapping a position of at least two cells of the second portion of the plurality of cells to produce a layout design; and
    manufacturing a set of masks used in integrated circuit fabrication processes based on the layout design.

2. The method of claim 1, wherein performing the design analysis comprises extracting the design characteristics comprising cell usage and a timing difference of each cell of the plurality of cells, the timing difference being based on pre-coloring arrangements.

3. The method of claim 1, wherein performing the library optimization further comprises performing an integer-linear programming (ILP) formulation to determine a non-deterministic polynomial-time hard problem.

4. The method of claim 3, wherein performing the library optimization further comprises the performing an ILP relaxation to relax the ILP formulation.

5. The method of claim 4, wherein performing the library optimization comprises determining the first portion of the plurality of cells to be placed using the single library for pre-coloring and the second portion of the plurality of cells to be placed using the plurality of libraries for pre-coloring based on the ILP relaxation.

6. The method of claim 5, wherein determining the first portion of the plurality of cells and the second portion of the plurality of cells comprises determining whether a product of a weight and a timing variation of a first cell of the plurality of cells is less than a timing variation constraint, wherein when the product of the first cell is greater than the timing variation constraint, the first cell is categorized in the first portion of the plurality of cells, and wherein when the product of the first cell is less than the timing variation constraint, the first cell being categorized in the second portion of the plurality of cells.

7. The method of claim 6, further comprising categorizing each cell of the plurality of cells in the first portion when the product of the first cell is greater than the timing variation constraint.

8. The method of claim 6, further comprising:
    determining whether a next cell from among the plurality of cells is less than or equal to a total number of cell types;
    determining whether at least one path includes the next cell from among the plurality of cells when the next cell is less than the total number of cell types; and
    categorizing the next cell in the second portion of the plurality of cells when the at least one path includes the next cell from among the plurality of cells.

9. The method of claim 8, further comprising categorizing all remaining cells from among the plurality of cells in the first portion of the plurality of cells when the at least one path omits the next cell.

10. An article of manufacture comprising a non-transitory computer readable medium having computer program logic stored thereon that, when executed by a computing device, causes the computing device to perform operations for using multiple libraries in cell placement, the operations comprising:
    preparing the multiple libraries, comprising:
        performing a design analysis based at least on one or more circuit simulations of a plurality of cells; and
        performing a library optimization comprising:
            determining a first portion of the plurality of cells to be placed using a single library for pre-coloring, and
            determining a second portion of the plurality of cells to be placed using a plurality of libraries for pre-coloring;
    placing the plurality of cells in a chip design based on the multiple libraries;
    swapping, a position of at least two cells of the second portion of the plurality of cells to produce a design layout; and manufacturing a set of masks used in integrated circuit fabrication processes based on the design layout.

11. The article of manufacture of claim 10, wherein performing the design analysis comprises extracting the design characteristics comprising cell usage and a timing difference of each cell of the plurality of cells, the timing difference being based on pre-coloring arrangements.

12. The article of manufacture of claim 10, wherein performing the library optimization further comprises performing an integer-linear programming (ILP) formulation to determine a non-deterministic polynomial-time hard problem.

13. The article of manufacture of claim 12, wherein performing the library optimization further comprises the performing an ILP relaxation to relax the ILP formulation.

14. The article of manufacture of claim 13, wherein performing the library optimization further comprises determining the first portion of the plurality of cells to be placed using the single library for pre-coloring and the second portion of the plurality of cells to be placed using the plurality of libraries for pre-coloring based on the ILP relaxation.

15. The article of manufacture of claim 14, wherein determining the first portion of the plurality of cells and the second portion of the plurality of cells comprises determining whether a product of a weight and a timing variation of a first cell of the plurality of cells is less than a timing variation constraint, wherein when the product of the first cell is greater than the timing variation constraint, the first cell is categorized in the first portion of the plurality of cells, and wherein when the product of the first cell is less than the timing variation constraint, the first cell being categorized in the second portion of the plurality of cells.

16. The article of manufacture of claim 15, wherein the operations further comprise categorizing each cell of the plurality of cells in the first portion when the product of the first cell is greater than the timing variation constraint.

17. The article of manufacture of claim 15, wherein the operations further comprise:
    determining whether a next cell from among the plurality of cells is less than or equal to a total number of cell types;
    determining whether at least one path includes the next cell from among the plurality of cells when the next cell is less than the total number of cell types; and
    categorizing the next cell in the second portion of the plurality of cells when the at least one path includes the next cell from among the plurality of cells.

18. The article of manufacture of claim 17, wherein the operations further comprise categorizing all remaining cells from among the plurality of cells in the first portion of the plurality of cells when the at least one path omits the next cell.

19. A system for generating a detailed placement, the system comprising:
    a memory that stores instructions for generating a cell placement using multiple libraries;
    a processor configured to:
        prepare the multiple libraries, comprising:
            perform a design analysis based at least on one or more circuit simulations of a plurality of cells; and
            perform a library optimization comprising:
                determining a first portion of the plurality of cells to be placed using a single library for pre-coloring, and
                determining a second portion of the plurality of cells to be placed using a plurality of libraries for pre-coloring;
        place the plurality of cells in a chip design based on the plurality of cell libraries;
        swap a position of at least two cells of the second portion of the plurality of cells to produce a design layout; and
        output the design layout to a machine readable storage medium, wherein the outputted layout is used to manufacture a set of masks used in integrated circuit fabrication processes;
    and
    a photolithography unit that uses the sets of masks in an integrated circuit fabrication process.

20. The system of claim 19, wherein the processor is further configured to:
    perform an integer-linear programming (ILP) formulation to determine a non-deterministic polynomial-time hard problem;
    perform an ILP relaxation to relax the ILP formulation; and
    determine the first portion, of the plurality of cells to be placed using the single library for pre-coloring and the second portion of the plurality of cells to be placed using the plurality of libraries for pre-coloring based on the ILP relaxation.

* * * * *